(12) United States Patent
Moriyasu et al.

(10) Patent No.: US 7,744,233 B2
(45) Date of Patent: Jun. 29, 2010

(54) BACKLIGHT DEVICE AND LIQUID CRYSTAL DISPLAY DEVICE

(75) Inventors: Mitsuhiro Moriyasu, Suzuka (JP); Hideyuki Chikazawa, Tsu (JP); Masaki Shimizu, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 251 days.

(21) Appl. No.: 12/093,291

(22) PCT Filed: Nov. 27, 2006

(86) PCT No.: PCT/JP2006/323580

§ 371 (c)(1),
(2), (4) Date: May 9, 2008

(87) PCT Pub. No.: WO2007/063799

PCT Pub. Date: Jun. 7, 2007

(65) Prior Publication Data

US 2009/0168396 A1 Jul. 2, 2009

(30) Foreign Application Priority Data

Nov. 30, 2005 (JP) .............................. 2005-345100

(51) Int. Cl.
*F21V 9/00* (2006.01)
*G09F 13/08* (2006.01)

(52) U.S. Cl. .................. 362/97.3; 362/230; 362/249.05

(58) Field of Classification Search ....... 362/97.1–97.4, 362/330, 230, 231, 612, 630, 631, 225, 228, 362/229, 295, 394, 249.05, 249.06, 249.08, 362/249.12, 249.14, 800; 315/76; 313/500; 349/61; 345/82, 83
See application file for complete search history.

(56) References Cited

U.S. PATENT DOCUMENTS 5,726,535 A    3/1998  Yan (Continued)

FOREIGN PATENT DOCUMENTS

EP    1517591 A1    3/2005

(Continued)

*Primary Examiner*—Bao Q Truong
(74) *Attorney, Agent, or Firm*—Birch, Stewart, Kolasch & Birch, LLP

(57) ABSTRACT

In order to control light emission of light emitting diodes, current dividing circuits are used to supply currents of a substantially fixed level to all lines. Light emitting diodes are arranged in groups of a predetermined number of LEDs in series, and sets of the light emitting diodes connected to the first line and sets of the light emitting diodes connected to the second line are laid out on the same straight line so as to form a single row. Substrates with these formed thereon are arranged adjacent to each other in the direction of the rows, so that sets of the light emitting diodes connected to the first line and sets of the light emitting diodes connected to the second line are arranged alternately. With this configuration, it is possible to provide a backlight device with a plurality of LED arrays arranged thereon, which can uniformly illuminate the entire screen with light from the LED arrays.

13 Claims, 9 Drawing Sheets

U.S. PATENT DOCUMENTS

| | | | |
|---|---|---|---|
| 6,521,879 | B1 | 2/2003 | Rand et al. |
| 7,324,174 | B2 * | 1/2008 | Hafuka et al. .................. 349/61 |
| 7,423,705 | B2 * | 9/2008 | Len-Li et al. .................. 349/61 |
| 7,661,835 | B2 * | 2/2010 | Chou et al. ................ 362/97.3 |
| 2004/0155596 | A1 | 8/2004 | Ushijima et al. |
| 2007/0081321 | A1 * | 4/2007 | Ahn et al. ..................... 362/97 |

FOREIGN PATENT DOCUMENTS

| | | |
|---|---|---|
| EP | 1521235 A2 | 4/2005 |
| JP | 2003-330424 A | 11/2003 |
| JP | 2004-139876 A | 5/2004 |
| JP | 2004-335443 A | 11/2004 |
| JP | 2005-100800 A | 4/2005 |

* cited by examiner $I_F = (V - V_F \times 6)/R$

BACKLIGHT DEVICE AND LIQUID CRYSTAL DISPLAY DEVICE

TECHNICAL FIELD

The present invention relates to a backlight device and a liquid crystal display device.

BACKGROUND ART

Conventionally, as one of display devices for display images, videos etc., liquid crystal display devices (LCD: Liquid Crystal Display) using liquid crystal have been known. LCDs have been widely used as the display devices for computers, mobile phones, television apparatus and the like. A liquid crystal display device is made up of a special liquid sandwiched and sealed between two glass plates and displays an image by changing the orientations of liquid crystal molecules by applying voltage so as to increase and decrease light transmittance. In this process, since the liquid crystal itself does not emits light, it has been known that a light source such as a cathode fluorescent lamp (CFL: Cathode Fluorescent Lamp) and the like is arranged behind the liquid crystal so that this light source is used as backlight.

Here, the CFL which is commonly used as the light source for backlight is a light source made up of three ROB wavelengths. However, when the power (brightness) of the CFL is enhanced, the brightness of every color increases equally, so that it is impossible to correct a particular color only.

To deal with this, backlight devices using two light sources are recently being developed. For example, a backlight (to be referred to as "hybrid backlight") that uses light emitting diodes (LED: Light Emitting Diode) in combination with CFLs at the same time (see patent document 1, for example) has been developed.

When LEDs are used for backlight, a plurality of lines of LEDs are connected in series in the row direction to form an arrayed arrangement (this condition of LEDs arranged in array will hereinbelow be called "LED array" as appropriate), so to realize backlight by illuminating the entire screen with light from LEDs.

Patent document 1:
Japanese Patent Application Laid-open 2004-139876

DISCLOSURE OF INVENTION

Problems to be Solved by the Invention

However, when LEDs are used for backlight, there occur the following problems. That is, since an LED essentially has properties as a point light source, when used for backlighting of a liquid crystal display etc., a large number of LEDs are connected in series to form an LED array that plays a role of an area light source.

However, the LED array of a series connection type entails a problem that there is a limit to the number of LEDs that can be connected in series. This problem will be described specifically using drawings. FIG. 10 is a diagram showing a state in which six LEDs are connected in series.

Usually, in order to turn on LEDs, a voltage $V_F$ to be applied across one LED is about 1.6 to 1.8 [V] while a current $I_F$ that flows through the LEDs is about 5 to 10 [mA]. Also, a resistance R for adjusting the current flowing through the LEDs is serially connected. Here, description will be made using a resistor of 430 [Ω] as resistance R.

In FIG. 10, when a voltage of 14 [V] is applied as a whole, the total voltage applied across all the LEDs is 1.6×6=9.6 [V] since six LEDs are connected. Accordingly, current $I_F$ is about 10 [mA] ((14−9.6)/430≅10). In this case LEDs will illuminate normally.

However, when voltage V is reduced to 11 [V] in order to lower the brightness of LED, current $I_F$ sharply lowers to 3 [mA] ((11−9.6)/430≅3 [mA]), so that it is impossible to make the LEDs illuminate normally.

In the above way, current $I_F$ flowing through the LEDs takes a current value proportional to (V−$V_F$×the number of LEDs). Accordingly, there is a tendency that the ratio of change of forward current $I_F$ to voltage variation becomes greater as the number of LEDs connected in series increases. Hence there has been the problem that a large number of current cannot be connected.

In order to solve the above problems, it is possible to construct a linear light source by arranging plural series of LED arrays on a line as shown in FIG. 11. However, this construction may cause a case where there is a difference between currents $I_F1$ and $I_F2$. For example, when there is variation in input voltage V, or because of the variance of resistors R or the variance of $V_F$ (here $V_F$≅1.6 to 1.8 V), LED arrays are prone to produce difference in brightness, which results in the cause or factor of brightness unevenness. In particular, since the variation of forward voltage $V_F$ can occur for each LED, the likelihood that current $I_F$ through one LED array differs that through another LED array becomes higher when an increased number of LEDs are connected in series as described above. As a result, the problem of brightness unevenness could be encouraged.

In view of the above problems, it is therefore an object of the present invention to provide a backlight device having a plurality of LED arrays arranged therein which can uniformly illuminate the entire screen with light from the LED arrays as well as providing a liquid crystal display device including this backlight device for a liquid crystal panel.

Means for Solving the Problems

In order to solve the above problems, a backlight device according to the invention of the present application includes: a plurality of LED arrays each comprised of a plurality of LEDs connected in series; and a substrate having a plurality of rows that are constructed by mounting the plurality of LEDs straight-wise, and is characterized in that between two LEDs provided as components of one of the plurality of LED arrays and mounted in a predetermined row of the plurality of rows, at least one LED as a component of another LED array is mounted with the two LEDs in the predetermined row.

Also, the backlight device according to the invention of the present application is characterized in that each of the LED arrays includes at least one LED that is serially connected between two LEDs mounted in a predetermined row and is mounted in a row other than the predetermined row.

Further, the backlight device according to the invention of the present application is characterized in that the plurality of LED arrays alternate their placements of LEDs between the plurality of rows.

Also, the backlight device according to the invention of the present application further includes a turnaround portion for forming serial connection between the LEDs that are mounted at the ends of two predetermined rows of the plurality of rows, and is characterized in that the plurality of LED arrays are mounted so as to alternate placements of LEDs of individual LED arrays between the two predetermined rows connected by the turnaround portion.

Also, the backlight device according to the invention of the present application is characterized in that the plurality of LED arrays are mounted so as to alternate placements of LEDs of individual LED arrays between two adjacent rows.

Further, the backlight device according to the invention of the present application is characterized in that two LEDs that are connected serially to the turnaround portion and mounted at the ends of two adjacent rows, belong to LED arrays dissimilar to each other.

Also, a backlight device according to the invention of the present application includes: an LED array comprised of a plurality of LEDs connected in series; and a substrate having a plurality of rows that are constructed by mounting the plural LEDs straight-wise; and a turnaround portion for forming serial connection between the LEDs that are mounted at the ends of two predetermined rows, and is characterized in that an LED that belongs to an array on the other side of the LED array with respect to the turnaround portion is sandwiched between two LEDs that belong to an array on one side of the LED array with respect to the turnaround portion, and are mounted to one of the rows and is mounted to the same row as the two LEDs.

Further, the backlight device according to the invention of the present application further includes a current dividing circuit which permits the LED array to share power supply with other LED array. It is also characterized in that the current dividing circuit is composed of two coils, and that an LED drive circuit for driving the LED array is constructed of a plurality of current dividing circuits, and the plurality of current dividing circuits divide current via a plurality of stages to give power supply to each LED array.

Additionally, the backlight device according to the invention of the present application is characterized in that in each of the LED arrays, LED mounted in series in each row is of a predetermined number.

Moreover, the backliqht device according to the invention of the present application is characterized in that wherein the backlight includes a plurality of fluorescent tubes arranged parallel to each other in combination with light emitting diodes, and each row is arranged between the plurality of fluorescent tubes.

Still more, a liquid crystal display device according to the invention of the present application is provided with a liquid crystal panel mounted with the above-described backlight device.

ADVANTAGE OF THE INVENTION

According to the configuration of the invention of the present application, since it is possible with a backlight device in which the plurality of LED arrays are arranged to make the LED arrays uniformly emit light across the entire screen, it is possible to provide a backlight device or liquid crystal display device which can suppress brightness unevenness or color unevenness to as low as possible. Further, it is also possible to eliminate brightness unevenness and color unevenness with respect to the direction perpendicular to the direction in which LED arrays are arranged.

Also, according to the configuration of the invention of the present application, in a backlight device or the like including the plurality of LED arrays, the parts for adopting light from the LED arrays for the LED drive circuit do not need to be prepared for every row, it is hence possible to reduce brightness unevenness or color unevenness to as low as possible with fewer number of circuit parts. In addition, brightness unevenness and color unevenness with respect to the direction perpendicular to the direction in which LED arrays are arranged can be eliminated without increasing the number of parts of the LED drive circuit, thus making it possible with a simple configuration to inhibit brightness unevenness and the like in the backlight.

Further, according to the invention of the present application, it is possible to achieve a process of mixing LED arrays and light from fluorescent tubes properly and hence eliminate brightness unevenness and color unevenness of the entire backlight surface without increasing the number of parts more than needed.

Figure 1:
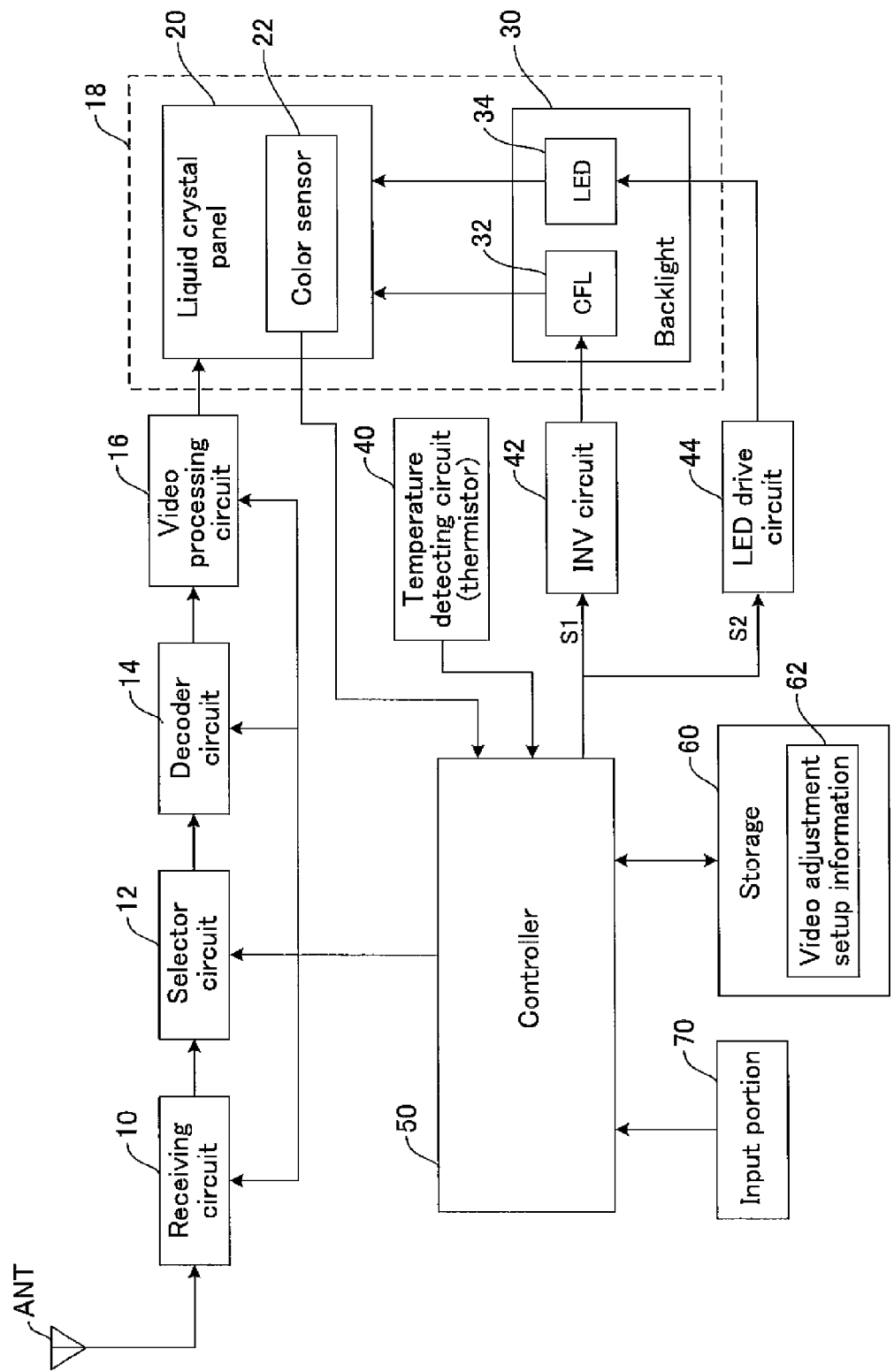
FIG. 1 is a block diagram showing a liquid crystal television using the invention of the present application.

DESCRIPTION OF REFERENCE NUMERALS 1 liquid crystal display device
10 receiving circuit
12 selector circuit
14 decoder circuit
16 video processing circuit
18 LCD
20 liquid crystal panel
22 color sensor
30 backlight
32 CFL
34 LED
40 temperature detecting circuit
42 INV circuit
44 LED drive circuit
442$a$, 442$b$ current dividing transformer coils
50 controller
60 storage
62 video adjustment setup information
70 input portion
300 housing
310 LED element
312 LED substrate
320 lamp holder
322 cathode fluorescent tube
330 reflection sheet 332 LED insert hole
51a, 51b turnaround portions
53 flexible cable

BEST MODE FOR CARRYING OUT THE INVENTION

Subsequently, the embodiment modes when the liquid crystal display device of the present invention is applied to a liquid crystal television will be described with reference to the drawings.

[Configuration]

FIG. 1 is a block diagram showing a configuration of a liquid crystal television. Liquid crystal television 1 includes a receiving circuit 10, a selector circuit 12, a decoder circuit 14, a video processing circuit 16, an LCD 18, a temperature detecting circuit (thermistor) 40, an inverter (INV) circuit 42, an LED drive circuit 44, a controller 50, a storage 60 and input portion 70, and has an external antenna ANT connected thereto.

Also, LCD 18 has a configuration in which a liquid crystal panel 20 and a backlight 30 are integrally housed. Further, a color sensor 22 for detecting RGB values based on the light of backlight irradiated from liquid crystal panel 20 is provided. Also, backlight 30 includes a CFL 32 and an LED 34 as its light source.

Receiving circuit 10 extracts broadcasting signals from the received signals input from external antenna ANT and outputs them to selector circuit 12. Then, selector circuit 12 selects a broadcasting signal corresponding to the channel that is selected by the user and outputs it to decoder circuit 14. Decoder circuit 14 decodes the video signal from the input broadcasting signal and outputs it to video processing circuit 16.

Video processing circuit 16 executes various video processes on the input video signal and outputs the resultant to LCD 18. Here, the video processes may includes various kinds of operations: for example, an operation for executing a video process is performed based on the values as to "brightness", "coloration" and/or the like set by the user. LCD 18 displays video based on the input video signal so that the user is able to watch the received broadcasting.

LCD 18 is constructed of liquid crystal panel 20 and backlight 30. For example, backlight 30 is arranged on the rear side of liquid crystal panel 20, forming one-body structure. Light irradiated from backlight 30 passes through liquid crystal panel 20 to make the user recognize video etc.

Liquid crystal panel 20 is formed of liquid crystal sealed between, for example two glass plates, externally enclosed with a box-like frame of a metal plate or the like. Formed on the lower glass plate surface of liquid crystal panel 20 are a plurality of source electrodes and a plurality of gate electrodes in a matrix form, forming a TFT for every pixel. Liquid crystal panel 20 also includes color sensor 22 for detecting RGB values of the light irradiated from backlight 30 that has passed through the liquid crystal of liquid crystal panel 20. Here, briefly describing backlight 30 though it will be detailed later, cathode florescent tubes (CEL) 32 and light emitting diodes (LED) 34 are used as the light source of backlight 30.

CFL 32 is formed of, for example cathode fluorescent tubes etc., to output light of RGB wavelengths. Based on an INV output control signal S1 supplied from controller 50, INV circuit 42 turns on CFL 32 by PWM (Pulse Width Modulation) lighting control to perform lighting control. Here, PWM lighting control is a control method of lighting to control the luminance by applying a rectangular wave-formed pulsating voltage of a predetermined frequency to INV circuit 42 as the circuit for driving CFL 32 while controlling the duty ratio of the pulsating voltage. When the duty ratio is 100%, the brightness of LCD 18 (backlight 30) becomes maximum.

LED 34 is made up of, for example light emitting diodes. Here, red light-emitting diodes are used. The red light-emitting diodes output red-color light having a wavelength longer than the wavelengths of red color output from CFL 32. Based on an LED output control signal S2 supplied from controller 50, LED drive circuit 44 turns on LED 34 by a current control lighting scheme to achieve lighting control. Here, the current control lighting scheme is a lighting control scheme in which LED drive circuit 44 varies the brightness of the LEDs by changing the level of the current to be output to LED 34 based on the LED output control signal input.

Temperature detecting circuit 40 is a sensor circuit for measuring the temperature inside liquid crystal television 1. For example, this circuit includes a thermistor etc., and detects the temperature inside liquid crystal panel 1 at all times and outputs the temperature measurement T to controller 50. Though various points can be considered as the place at which temperature is detected, description will be made in the present embodiment, assuming that the temperature of the backlight is detected. Here, needless to say, the temperature of the control board or the temperature inside the housing of liquid crystal television 1 may be measured.

Controller 50 executes an operation based on a predetermined program in accordance with input instructions and gives instructions to individual functional components and performs data transfer. Specifically, controller 50 controls individual circuits and individual functional components in liquid crystal television 1. Here, controller 50 is composed of, for example a CPU (Central Processing Unit) etc.

Storage 60 is a memory that is writable at any time to temporarily hold data and the like for performing the various operations and these programs effected by controller 50. Stored in storage 60 is video adjustment setup information 62. As video adjustment setup information 62 the screen brightness, coloration and other set values, designated by the user have been recorded. Controller 50, in accordance with the set values stored in video adjustment setup information 62, makes control for adjusting the brightness, image quality and the like of the image to be displayed on LCD 18. Storage 60 is composed of, for example, RAM (Random Access Memory), memory cards, HDDs and the like.

Input portion 70 is an input device equipped with a group of keys necessary for command input of operations from the user and outputs signals of keys that are pressed down to controller 50. Key input through this input portion 70 enables modification etc., of video adjustment setup information, for example.

[Backlight]

Figure 2:
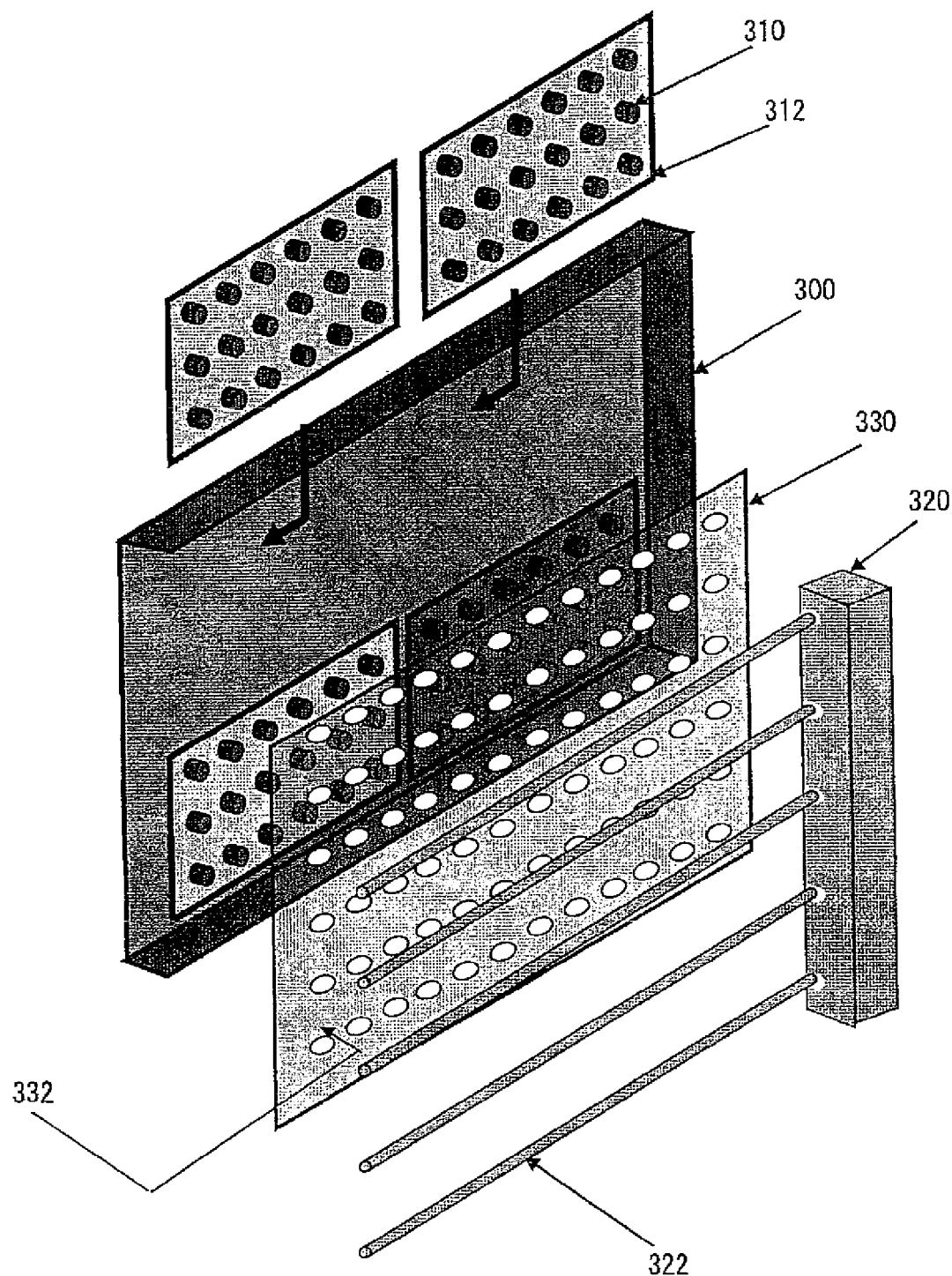
FIG. 2 is a view showing a backlight structure to which the invention of the present application is applied.

Next, backlight 30 will be described in detail. FIG. 2 is a view showing a backlight structure. Backlight 30 includes CFL 32 and LED 34. Here, CFL 32 is made up of a plurality of cathode fluorescent tubes 322 arranged parallel to each other and is fixed by lamp holders 320. LED substrates 312 on which LED elements 310 are arranged in a predetermined pattern, are connected matrix-wise and accommodated in a housing 300. Arranged between cathode fluorescent tubes 322 and LED elements 310 is a reflection sheet 330. This reflection sheet 330 is formed with LED insert holes 332 which are arranged in the same pattern as the LED elements are arranged, so that light emitted from LED elements 310 passes through LED insert holes 332 and illuminates the liquid crystal panel.

Figure 3:
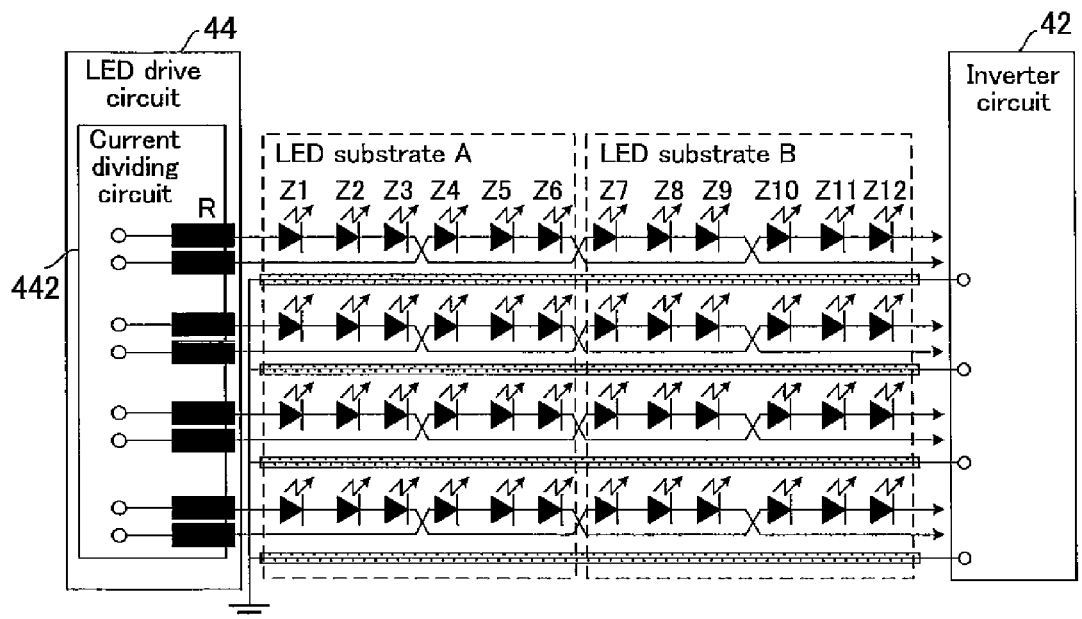
FIG. 3 is a diagram showing the condition of a backlight, LED drive circuit and inverter circuit in the present embodiment.

FIG. 3 is a diagram showing the condition of backlight 30, inverter circuit (INV circuit) 42, LED drive circuit 44. As shown in FIG. 3, CFL 32 as a part of backlight 30 is connected to inverter circuit 42 while LED 34 is connected to current dividing circuit 442 of LED drive circuit 44.

Figure 5:
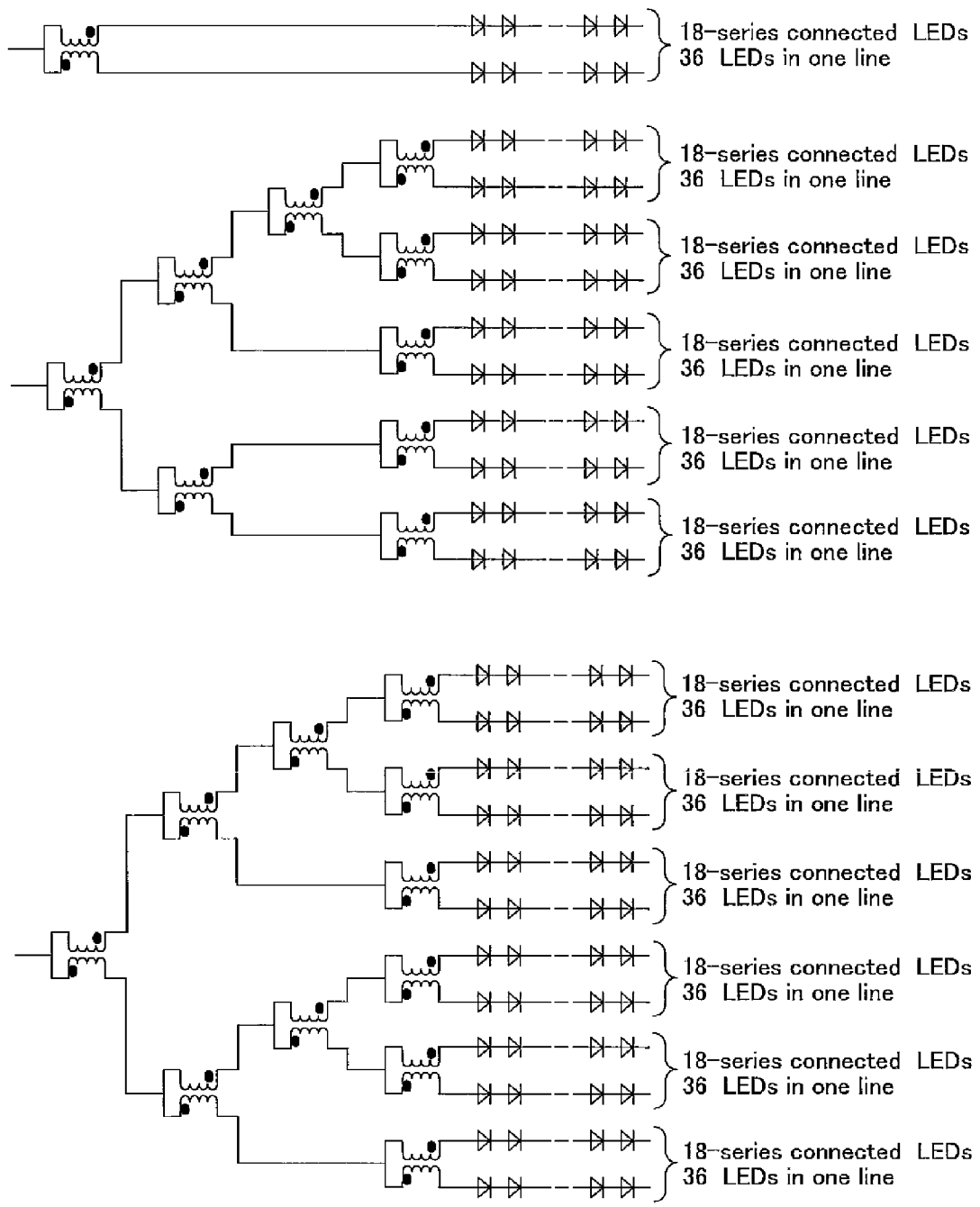
FIG. 5 is a diagram showing one example of a current dividing circuit.

Current diving circuit 442 is a circuit that supplies currents of the same level to a plurality of LED lines. FIG. 5 shows one example of current dividing circuit 442. In FIG. 5, LED lines are connected so that one line, five lines and six lines are grouped from the above. The currents output from current dividing circuit 442 flow through the LEDs and then are fed back and input again to current dividing circuit 442. Current dividing circuit 442 output currents again by adjusting the current level to be output based on the condition of the input currents. This configuration makes it possible to perform control so that currents of the same level can flow through all the LED lines.

Figure 4:
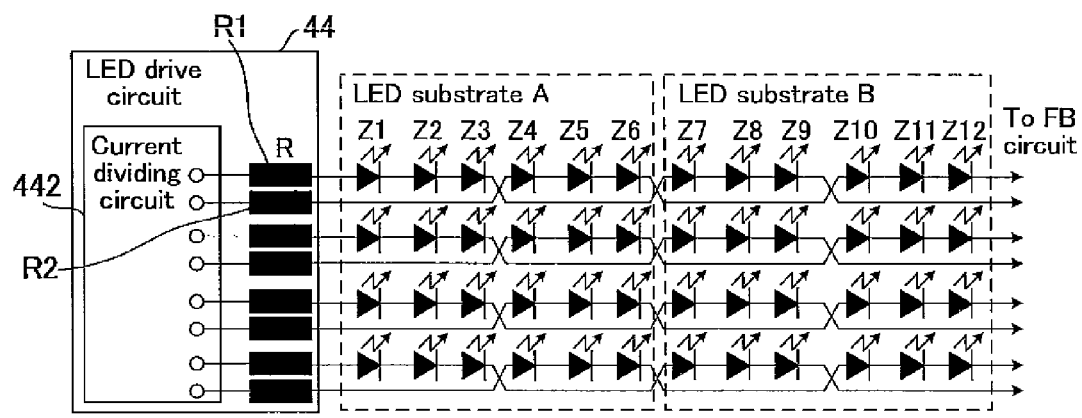
FIG. 4 is a diagram for illustrating a pattern of arrangement of an LED drive circuit and LEDs in the present embodiment.

Here, for descriptive purposes, LED 34 and LED drive circuit 44 alone are shown in FIG. 4. Here, LEDs are connected separately to individual lines output from a plurality of current diving circuits. In addition, each LED substrate has multiple sets of a predetermined number of LEDs arranged thereon. For example, in LED substrate A, LEDs Z1, Z2 and Z3 are connected in series forming one set. Also, LEDs Z4, Z5 and Z6 are connected in series forming another set.

The set of Z1, Z2 and Z3 is connected to the first line via the first resistor R1 from above. Similarly, the set of Z4, Z5 and Z6 is connected to the second line via the second resistor R2 from above. Further, similarly, the set of LEDs Z7, Z8 and Z9 on LED substrate B is connected to the first line in series with the set of Z1, Z2 and Z3 on LED substrate A. Similarly, the set of LEDs Z10, Z11 and Z12 on LED substrate B is connected to the second line in series with the set of Z4, Z5 and Z6 on LED substrate A.

In this way, for each LED substrate, the LEDs on the same straight line (row) are laid out in such a pattern that the sets of LEDs connected to the first line and the sets of LEDs connected to the second line alternate. The third line is also arranged in the same manner such that the third line and fourth line, and the fifth line and sixth line alternate, respectively.

In the above way, since the LEDs connected on the same straight line are connected to different lines, if there are some variations in brightness of light emission between lines of LEDs, the variations in brightness of light emission can be alleviated so that emission of light is leveled off across the entire backlight. As a result, it is possible to prevent occurrence of color unevenness across the entire liquid crystal display device. In addition, the LEDs connected to the same line are arranged in the corresponding positions in respective LED substrates (for example, three LEDs in the upper left in each substrate) and emit light to display.

Further, LED substrates connected to each other have the same wiring patterns. Accordingly, it is not necessary to produce substrates with different wiring patterns between LED substrate A and LED substrate B. Further, since they have the same wiring pattern, it is possible to assemble them without regard to the order. This makes it possible to reduce the cost for manufacturing the backlight.

It is also possible to provide a backlight free from color unevenness across the screen in a hybrid backlight and the like, which is formed in combination with light sources of different wavelengths such as CFL shown in FIG. 3.

VARIATIONAL EXAMPLE

Though each of the above embodiments is described taking an applied example of a liquid crystal television, the liquid crystal display device of the present invention is not limited to these products, but can be of course applied to any product as long as it uses liquid crystal for a display device. Applicable examples of equipment include mobile phones, personal computers, PDAs (Personal Digital Assistants), liquid crystal monitors, car navigation equipment and the like.

Further, though the present embodiment was described referring to a case that is applied to a hybrid backlight, the application is not limited to this. For example, it goes without saying that this can be applied to a full LED backlight using three color LEDs, i.e., blue, red and green LEDs with no cathode fluorescent lamp.

Further, though the present embodiment was described taking a case in which two LED substrates are connected in series in the row direction, the embodiment is not limited to this but a greater number of LED substrates may be repeatedly connected.

Also, though the present embodiment was described taking a configuration in which the sets of light emitting diodes, connected on the same row use two lines. However, it is of course possible to arrange the sets connected to three or more lines.

Figure 6:
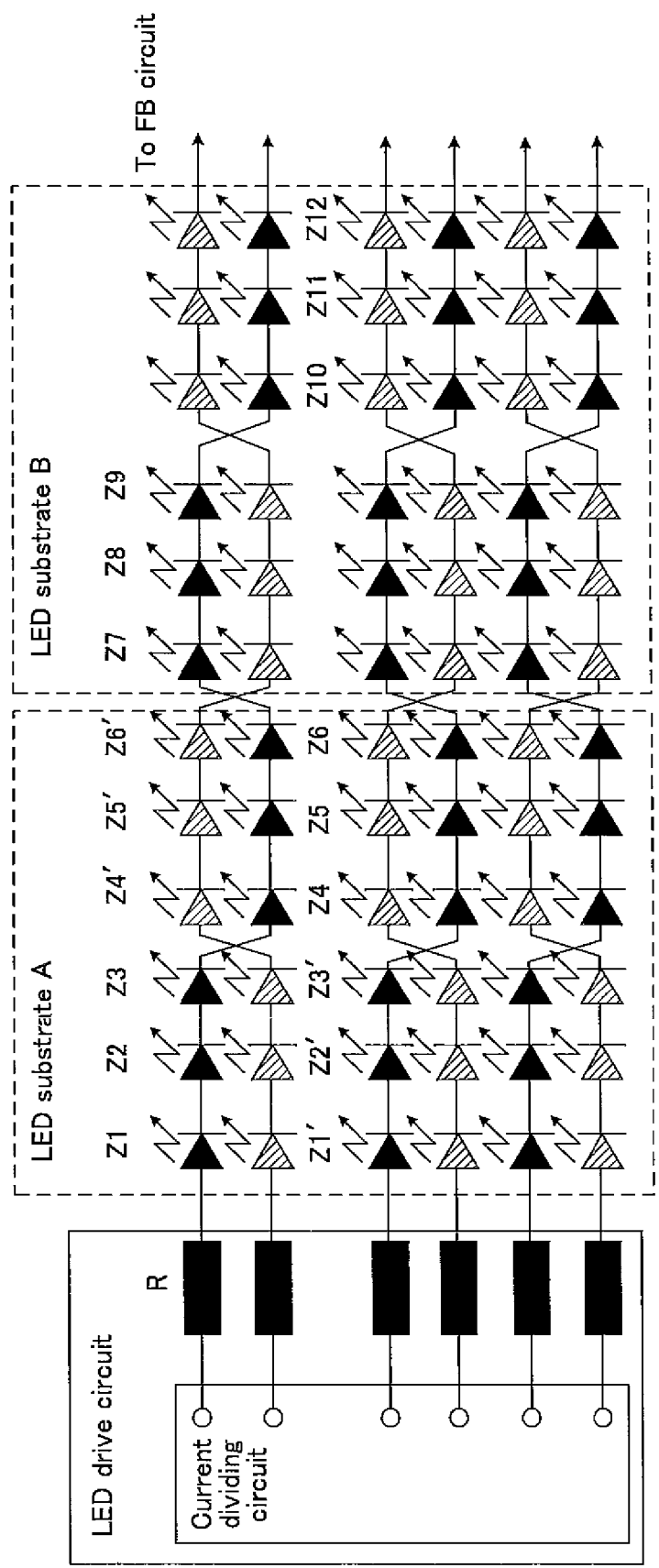
FIG. 6 is a diagram for illustrating a pattern of arrangement of an LED drive circuit and LEDs in the present embodiment.

Further, as embodiment 2, a greater number of LEDs may be connected as shown in FIG. 6. Specifically, as the LEDs connected to the first line, LEDs Z1, Z2 and Z3 in the first row on LED substrate A and LEDs Z4, Z5 and Z6 in the second row on LED substrate A may be serially connected. Further, FIG. 6 shows a state in which as the LEDs connected to the second line, LEDs Z1', Z2' and Z3' placed in the second row on LED substrate A and LEDs Z4', 75' and Z6' provided in the first row on LED substrate A are serially connected. In this way, the LEDs connected to the first line and those to the second lines are arranged in combination so that they are laid out in the first and second rows on LED substrate A, so that it is possible to further reduce two-dimensional color unevenness or brightness unevenness. Also, as compared to embodiment 1 shown in FIG. 4, it is no longer necessary to provide lengthy interconnection wirings for the first and second lines, hence it is possible to effect an efficient wiring process on the substrate.

Figure 8:
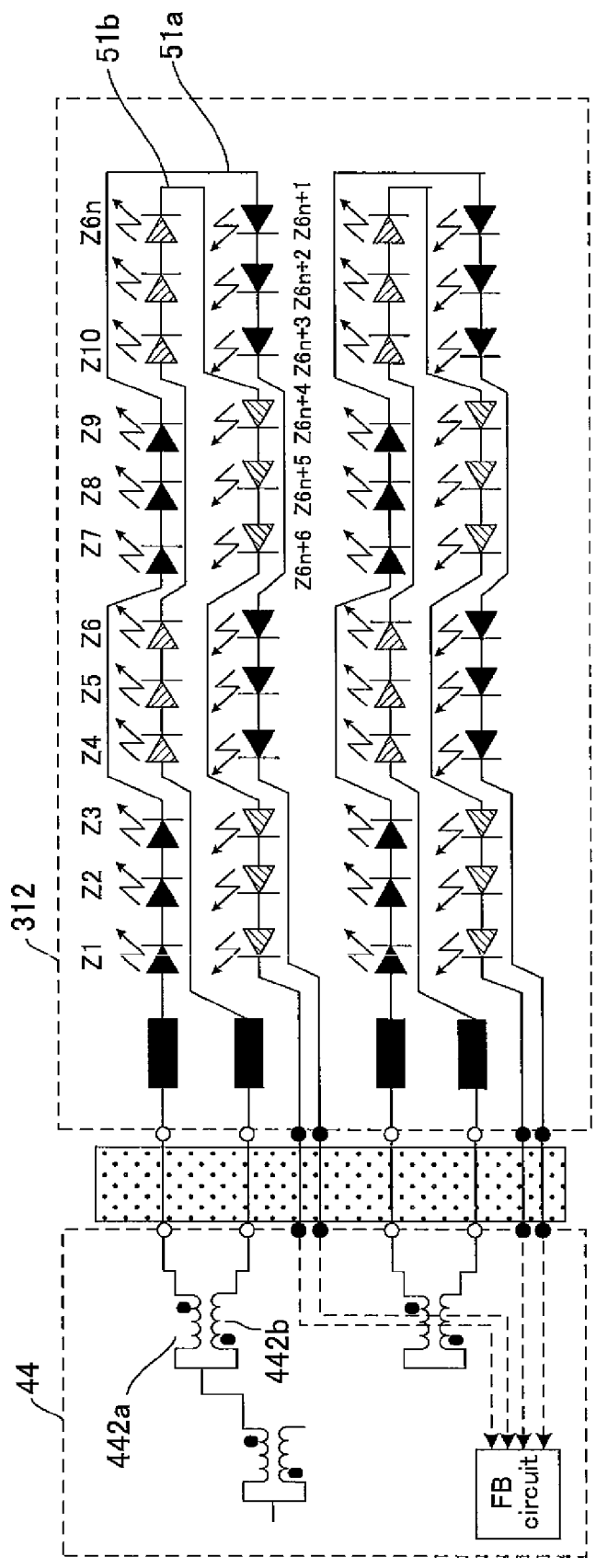
FIG. 8 is a diagram for illustrating a pattern of arrangement of an LED drive circuit and LEDs in another embodiment of the invention of the present application.
Figure 9:
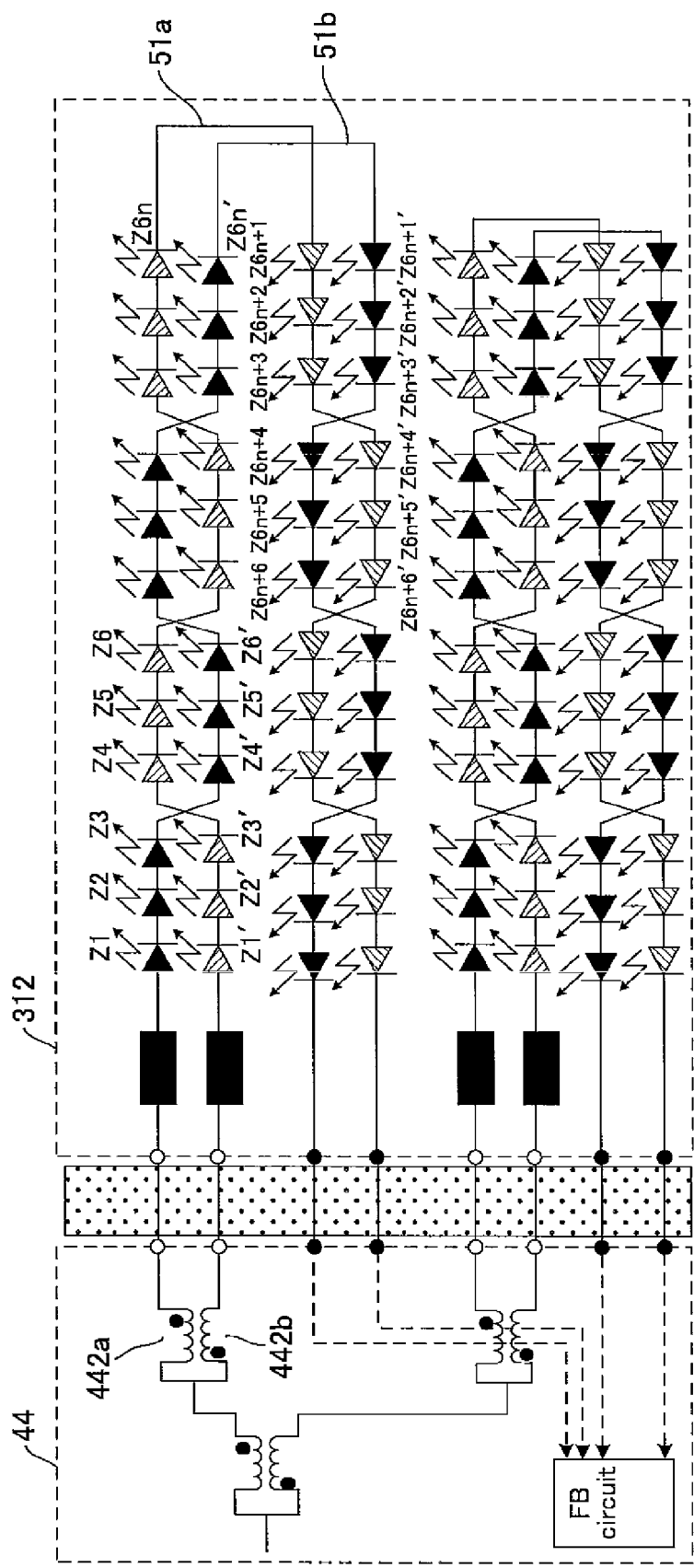
FIG. 9 is a diagram for illustrating a pattern of arrangement of an LED drive circuit and LEDs in another embodiment of the invention of the present application.
Figure 10:
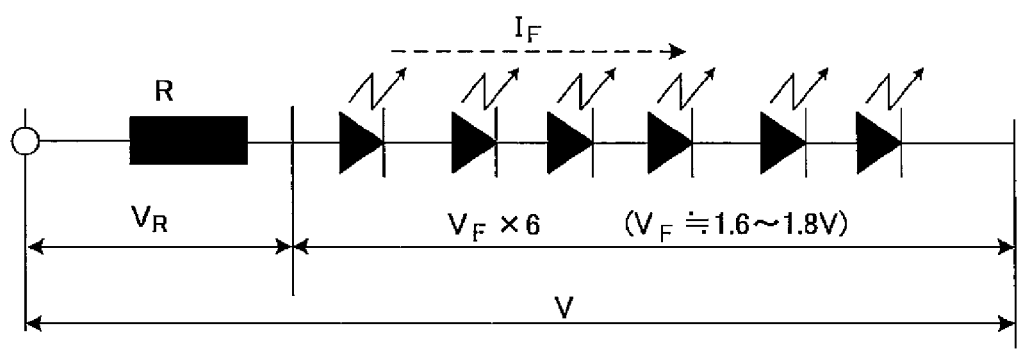
FIG. 10 is a diagram showing a connected condition of LEDs.
Figure 11:
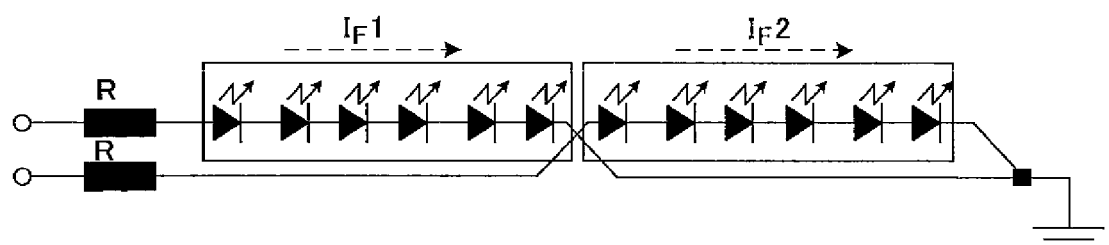
FIG. 11 is a diagram showing a connected condition of LEDs.

Next, other embodiments 3 to 5 will be described with reference to FIGS. 7 to 9.

Embodiment 3

Figure 7:
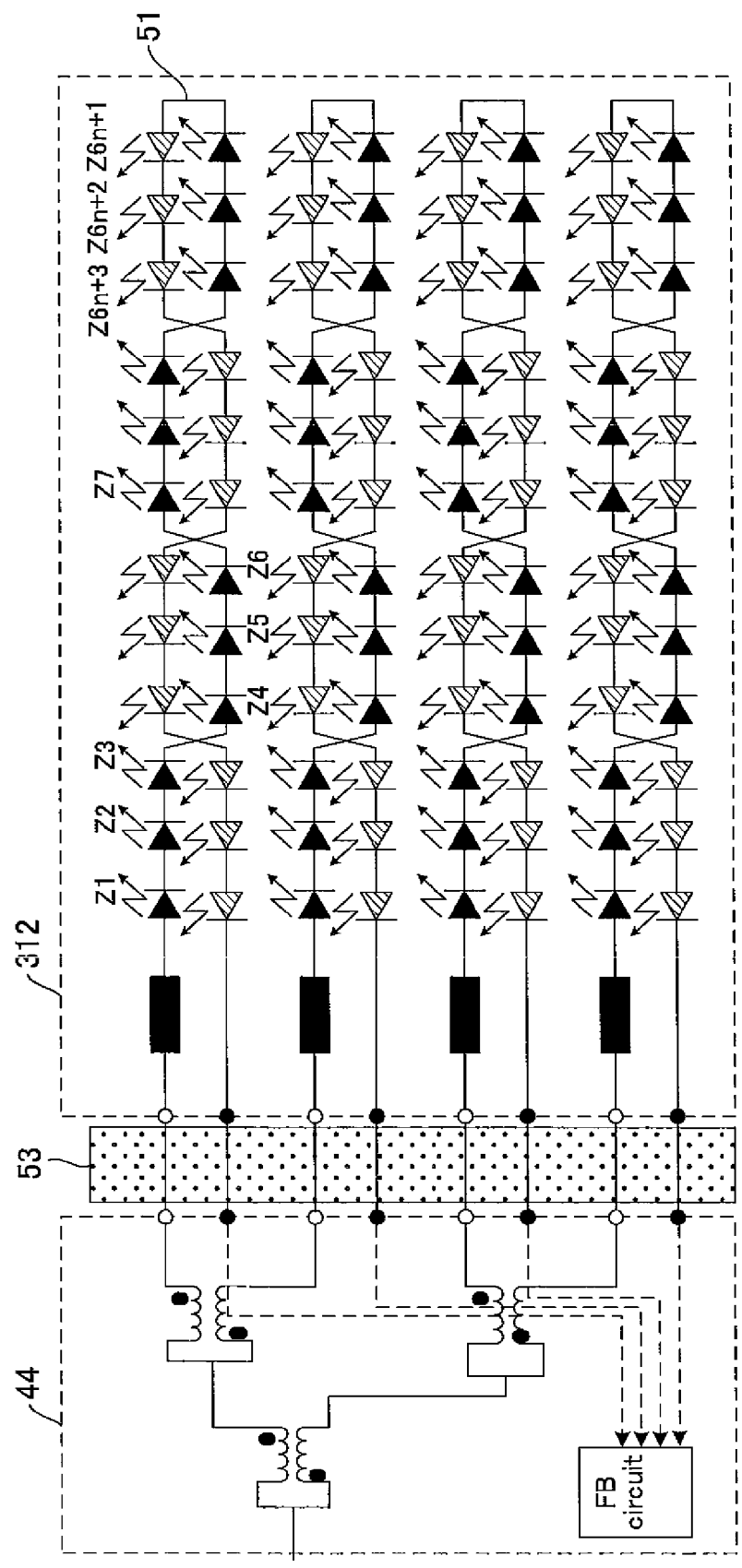
FIG. 7 is a diagram for illustrating a pattern of arrangement of an LED drive circuit and LEDs in another embodiment of the invention of the present application.

FIG. 7 shows as embodiment 4 according to the invention of the present application, a configurational example in which a serially connected one-line LED array is arranged in a twisted pattern.

As a specific configuration, a plurality of LEDs connected in series are arranged from one row to another with its one end connected via flexible cable to one of the coils as a part of the current dividing circuit on the drive circuit board. A series of three LEDs (Z1~3) from the end in the first row on the substrate is electrically connected to a series of three LEDs (Z4~6) positioned in the second row in the horizontal direction (the direction in which serially connected LEDs are continuously arranged in the same row). Subsequently, this is further connected again to LEDs (Z7~) in the first row.

This is taken as a repeat unit, and the repeat units of LEDs are serially connected a plurality of times (N) in the horizontal direction. Thereafter, a wiring pattern 51 that reverses the direction of the arrangement of LEDs is provided, and a series of the same number (three) of LEDs (Z6n+1~Z6n+3) arranged with their LED's polarity inverted relative to those heretofore is connected, then the repeat units are arranged N times so that adjacent LEDs in the first and second rows are connected.

By this connecting method, 2N×6 LEDs, composed of serially connected 2N repeat units in total, are connected in a twisted manner on the LED substrate, whereby it is possible to construct a backlight which is uniform in brightness and color across the entire surface.

Thus, the same number of serially connected LEDs connected to the other coil of the aforementioned current dividing circuit, are arranged in the third and fourth rows in the same manner, whereby it is possible to construct a backlight having a larger screen.

Embodiment 4

Next, embodiment 4 according to the invention of the present application shown in FIG. 8 will be described.

The present embodiment is a developed example of the aforementioned embodiment 1 (FIG. 4), in which two lines of LED arrays serially connected from different coils of a current dividing circuit are mounted in an LED array mounting row formed for mounting a plurality of LEDs in a straight line configuration on the LED substrate, in such a manner that the two lines alternate each other with respect to the direction of arrangement of the mounting row, and each line has a turn-around portion, and the returned two lines of LEDs are mounted in another LED array mounting row on the LED substrate, in such a manner that the two lines alternate each other with respect to the direction of arrangement of the mounting row.

Illustratively, two coils 442a and 442b of current dividing circuit 442 are connected to the terminals provided at the edge of the LED substrate so that one coil 442a is serially connected to the end of the first row from which a series of three LEDs (Z1~3) starts. The other coil 442b is serially connected to LEDs (Z4~6) located next in the first row. Then the aforementioned LED (Z3) is serially connected to subsequent LEDs (Z7~9) in the same row while the other LED (Z6) is serially connected to subsequent LEDs (Z10~) in the same row, in a similar manner. In other words, two LED lines serially connected to different coils are arranged in the same row, forming a condition in which each line alternates with the other every predetermined number of LEDs.

Then, the aforementioned pattern of LEDs (Z1~6) is taken as a repeat unit, and N repeat units are formed on the substrate, then a turnaround wiring 51 similar to the previous embodiment (turnaround wiring 51b connecting Z6n with Z6n+4 and 51a connecting Z9 with Z6n+1) is formed for each line, then the second row is formed from LED(Z6n+1) in such a manner that LEDs (Z6n+1~Z6n+3) is serially connected to one line while LEDs (Z6n+4~Z6n+6) is serially connected to the other line and laid out in the same row.

As a result of the repeated connecting process as above, the two LED lines that are output from the current dividing circuit are created on the LED substrate such a condition that LEDs of the different lines are arranged alternately every predetermined number, ranging two rows by forming a U-shape pattern (folding back), hence it is not only possible to solve brightness unevenness and color unevenness between LEDs that belong to the same row but also have additional effect on suppressing brightness unevenness etc., two-dimensionally. Further, as to the structure for the third and fourth rows, two LED lines that connected to two coils of another current dividing circuit are formed in a similar manner, so that it is possible to construct a backlight that is free from brightness unevenness and the like and suitable for a greater screen.

Embodiment 5

Another embodiment 5 according to the invention of the present application will be described with FIG. 9.

Similarly to embodiment 4, the present embodiment is a developed example of the aforementioned embodiment 1 (FIG. 4). Specifically, two lines of LED arrays serially connected from different coils of a current dividing circuit are mounted in a pair of parallel LED array mounting rows formed for mounting a plurality of LEDs in a straight line configuration, in such a manner that the two lines alternate each other with respect to the direction of arrangement of the mounting rows, and each line has a turnaround portion, and the returned two lines of LEDs are mounted in another pair of parallel LED array mounting rows on the LED substrate, in such a manner that the two lines alternate each other with respect to the direction of arrangement of the mounting rows.

Illustratively, two coils 442a and 442b of current dividing circuit 442 are connected to the terminals provided at the edge of the LED substrate so that one coil 442a is serially connected to the end of the first row from which a series of three LEDs (Z1~3) starts while the other coil 442b is serially connected to the end of the row from which a series of three LEDs (Z1'~3') starts. Then, the aforementioned LED(Z3) is serially connected to subsequent LEDs (Z4'~6') in the second row while the other LED(Z3') is serially connected to LEDs (Z4~6) in the first row in an opposite way. In other words, two LED lines serially connected to different coils are arranged in the first and second LED array mounting rows, forming a condition in which each LED line alternates with the other in the direction of arrangement of the rows.

Then, the aforementioned pattern of LEDs (Z1~6) and LEDs (Z1'~6') is taken as a repeat unit, and N repeat units are formed on the substrate, then a turn around wiring 51 similar to the previous embodiment is formed for each line, then the third and fourth rows are formed from LED(Z6n+1) and LED(Z6n+1'). Specifically, Z6n and Z6n+1 are connected by turnaround wiring 51a, and Z6n' and Z6n+1' are connected by turnaround wiring 51b.

Further, one of the two lines, that is, a series of LEDs (Z6n+1~Z6n+3) in the third row is serially connected to a series of LEDs (Z6n+4'~Z6n+6') in the fourth row. The other line, that is, a series of LEDs (Z6n+1'~Z6n+3') in the fourth row is serially connected to a series of LEDs (Z6n+4~Z6n+6) in the fourth row. This pattern is taken as a repeat unit, and the same number of the units are repeated as above to effect the LED mounting process for the third and fourth rows.

As a result of the repeated connecting process as above, the two LED lines that are output from the current dividing circuit are created on the LED substrate such a condition that lines of LEDs are arranged alternately every predetermined number, ranging four rows by forming U-shape patterns (folding back), hence it is not only possible to solve brightness unevenness and color unevenness between LEDs that belong to the same row but also have additional effect on suppressing brightness unevenness etc., two-dimensionally.

The invention of the present application, inclusive the above multiple embodiments, may produce another effect of realizing backlight for a large screen, of which brightness unevenness and color unevenness are suppressed by uniformly illuminating the entire screen with light from a plurality of lines of LED arrays arranged in a backlight device.

Here, in the present embodiment, concerning the point that the positional relationship between the LEDs to be connected between the first row and the second row is described to be "positioned in the horizontal direction", this not only specifies the positional relationship between the LEDs that are directly connected to each other but may also indicate the positional relationship between the middles of two series of three LEDs arranged on the same row, for example.

Further, the number of LEDs connected in series on the same row is specified to be three in the embodiment, but the number need not be the same with the embodiment. That is, the number may be preferably specified within the range of about one to ten, taking into account the aim that color unevenness and brightness unevenness due to variations in color or luminance of the connected serially LEDs should be eliminated.

Though the times of repetition of the above repeat units for one line is specified to be even in the embodiment, this is of no particular importance. When odd repeat units are formed, the number of repeat units up to its turnaround wiring is about (integer+0.5) times. However, the numbers of LEDs mounted before and after the turnaround wiring do not need to be exactly equal to each other, but any arrangement may be sufficient as long as the advantage of the invention of the present application can be obtained.

The invention claimed is:

1. A backlight device comprising:
a plurality of LED arrays each comprised of a plurality of LEDs connected in series; and
a substrate having a plurality of rows that are constructed by mounting the plurality of LEDs straight-wise,
wherein between two LEDs provided as components of one of the plurality of LED arrays and mounted in a predetermined row of the plurality of rows, at least one LED as a component of another LED array is mounted with the two LEDs in the predetermined row.

2. The backlight device according to claim 1, wherein each of the LED arrays includes at least one LED that is serially connected between two LEDs mounted in a predetermined row and is mounted in a row other than the predetermined row.

3. The backlight device according to claim 2, wherein the plurality of LED arrays alternate their placements of LEDs between the plurality of rows.

4. The backlight device according to claim 1, further comprising a turnaround portion for forming serial connection between the LEDs that are mounted at the ends of two predetermined rows of the plurality of rows,
wherein the plurality of LED arrays are mounted so as to alternate placements of LEDs of individual LED arrays between the two predetermined rows connected by the turnaround portion.

5. The backlight device according to claim 4, wherein the plurality of LED arrays are mounted so as to alternate placements of LEDs of individual LED arrays between two adjacent rows.

6. The backlight device according to claim 4, wherein two LEDs that are connected serially to the turnaround portion and mounted at the ends of two adjacent rows, belong to LED arrays dissimilar to each other.

7. A backlight device comprising:
an LED array comprised of a plurality of LEDs connected in series; and
a substrate having a plurality of rows that are constructed by mounting the plurality of LEDs straight-wise; and
a turnaround portion for forming serial connection between the LEDs that are mounted at the ends of two predetermined rows,
wherein an LED that belongs to an array on the other side of the LED array with respect to the turnaround portion is sandwiched between two LEDs that belong to an array on one side of the LED array with respect to the turnaround portion and are mounted to one of the rows, and is mounted to the same row as the two LEDs.

8. The backlight device according to claim 1 or 7, further comprising a current dividing circuit which permits the LED array to share power supply with other LED array.

9. The backlight device according to claim 8, wherein the current dividing circuit is composed of two coils.

10. The backlight device according to claim 9, wherein an LED drive circuit for driving the LED array is constructed of a plurality of current dividing circuits, and the plurality of current dividing circuits divide current via a plurality of stages to give power supply to each LED array.

11. The backlight device according to claim 1 or 7, wherein in each of the LED arrays, LED mounted in series in each row is of a predetermined number.

12. The backlight device according to claim 1 or 7, wherein the backlight includes a plurality of fluorescent tubes arranged parallel to each other in combination with light emitting diodes, and each row is arranged between the plurality of fluorescent tubes.

13. A liquid crystal display device provided with a liquid crystal panel mounted with the backlight device according to claim 1 or 7.

* * * * *